US009526106B2

(12) United States Patent
Jeon et al.

(10) Patent No.: US 9,526,106 B2
(45) Date of Patent: Dec. 20, 2016

(54) METHOD AND APPARATUS FOR TRANSMITTING DATA IN WIRELESS COMMUNICATION SYSTEM

(71) Applicant: Samsung Electronics Co. Ltd., Suwon-si, Gyeonggi-do (KR)

(72) Inventors: Jo-Seph Jeon, Seongnam-si (KR); Hye-Mi Park, Yongin-si (KR); Eun-Yong Kim, Hwaseong-si (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 226 days.

(21) Appl. No.: 13/755,660

(22) Filed: Jan. 31, 2013

(65) Prior Publication Data
US 2013/0195053 A1    Aug. 1, 2013

(30) Foreign Application Priority Data

Feb. 1, 2012   (KR) ........................ 10-2012-0010210

(51) Int. Cl.
H04L 12/28 (2006.01)
H04W 72/08 (2009.01)
H04W 72/04 (2009.01)
H04L 1/00 (2006.01)
H04W 72/12 (2009.01)
H04W 28/16 (2009.01)

(52) U.S. Cl.
CPC .......... *H04W 72/082* (2013.01); *H04L 1/0015* (2013.01); *H04L 1/0026* (2013.01); *H04L 1/0034* (2013.01); *H04L 1/0035* (2013.01); *H04W 72/0406* (2013.01); *H04W 72/1226* (2013.01); *H04W 28/16* (2013.01)

(58) Field of Classification Search
CPC . H04W 72/0406; H04W 28/048; H04W 28/16
USPC .......................................................... 370/329
See application file for complete search history.

(56) References Cited

U.S. PATENT DOCUMENTS 7,010,316 B2    3/2006  Chen
8,165,047 B2    4/2012  Lee et al.
(Continued)

FOREIGN PATENT DOCUMENTS

KR    10-2004-0037194 A    5/2004
KR    10-2008-0063109 A    7/2008

OTHER PUBLICATIONS

Zheng et al., Downlink Link Adaptation Scheme for IEEE 802.16m, Call for Contributions on Project 802.16m SDD: Link Adaptation Scheme, Session #56: Denver, USA, Jul. 7, 2008, pp. 1-20, C802.16m-08/742, IEEE.

*Primary Examiner* — Mark Rinehart
*Assistant Examiner* — Matthew Hopkins
(74) *Attorney, Agent, or Firm* — Jefferson IP Law, LLP

(57) ABSTRACT

A method for transmitting data by a base station in a wireless communication system is provided. The method includes transmitting a response signal for downlink data received from a user equipment and channel state information to a central coordinator, receiving scheduling information from the central coordinator and determining an interference control mode determined according to whether interference of adjacent base stations is controlled, based on the scheduling information, and transmitting data to the user equipment by using a Modulation and Coding Scheme (MCS) level according to the determined interference control mode.

20 Claims, 7 Drawing Sheets

(56) References Cited

U.S. PATENT DOCUMENTS

| | | |
|---|---|---|
| 2009/0141673 A1 | 6/2009 | Hwang et al. |
| 2009/0247086 A1* | 10/2009 | Lin et al. ............... 455/67.11 |
| 2010/0002607 A1* | 1/2010 | Kim ................... H04B 7/024 370/280 |
| 2010/0009634 A1* | 1/2010 | Budianu et al. ............ 455/63.1 |
| 2010/0182951 A1 | 7/2010 | Park et al. |
| 2012/0195272 A1* | 8/2012 | Hong et al. ............... 370/329 |
| 2012/0202477 A1* | 8/2012 | Eriksson .................... 455/419 |

\* cited by examiner

METHOD AND APPARATUS FOR TRANSMITTING DATA IN WIRELESS COMMUNICATION SYSTEM

PRIORITY

This application claims the benefit under 35 U.S.C. §119 (a) of a Korean patent application filed in the Korean Intellectual Property Office on Feb. 1, 2012 and assigned Ser. No. 10-2012-0010210, the entire disclosure of which is hereby incorporated by reference.

BACKGROUND OF THE INVENTION

1. Field of the Invention:

The present invention relates to a method and an apparatus for transmitting data in a wireless communication system. More particularly, the present invention relates to a method for determining a Modulation and Coding Scheme (MCS) level suitable for a channel state of a receiver by considering whether interference is controlled in a wireless communication system.

2. Description of the Related Art:

Recently, active research on wideband wireless communication systems is in progress. In wideband wireless communication systems, a modulation scheme and an error correction code encoding rate of data to be transmitted are determined according to the channel environment. For example, in wideband wireless communication systems, an MCS level for a downlink transmission is determined according to the following method.

When a base station has received a response signal, i.e., an Acknowledgement (ACK)/Negative Acknowledgement (NACK) signal, to channel state information and downlink data from a User Equipment (UE), the base station determines a channel state of the UE based on the channel state information and the ACK/NACK signal. Furthermore, the base station detects an MCS level corresponding to the determined channel state with reference to an MCS determination table including MCS level information for each preset channel state. Subsequently, the base station transmits downlink data to the UE by using the detected MCS level.

As described above, the MCS level is determined by considering only the channel state information and an ACK/NACK signal received from the UE regardless of interference of an actual UE channel environment. Accordingly, there is difficulty in determining the MCS level with accurate reflection of the channel state of the UE.

Therefore, a need exists for a method and an apparatus for determining an MCS level suitable for a channel state of a receiver by considering whether interference is controlled in a wireless communication system.

The above information is presented as background information only to assist with an understanding of the present disclosure. No determination has been made, and no assertion is made, as to whether any of the above might be applicable as prior art with regard to the present invention.

SUMMARY OF THE INVENTION

Aspects of the present invention are to address at least the above-mentioned problems and/or disadvantages and to provide at least the advantages described below. Accordingly, an aspect of the present invention is to provide a method and an apparatus for transmitting data in a wireless communication system.

Another aspect of the present invention is to provide a method and an apparatus for determining a Modulation and Coding Scheme (MCS) level suitable for a channel state of a receiver by considering whether interference is controlled in a wireless communication system.

Still another aspect of the present invention is to provide a method and an apparatus for improving data transmission efficiency in a wireless communication system by using an MCS level corresponding to a channel state of a receiver that considers interference.

In accordance with an as aspect of the present invention, a method for transmitting data by a base station in a wireless communication system is provided. The method includes transmitting a response signal for downlink data received from a user equipment and channel state information to a central coordinator, receiving scheduling information from the central coordinator and determining an interference control mode determined according to whether interference of adjacent base stations is controlled, based on the scheduling information, and transmitting data to the user equipment by using an MCS level according to the determined interference control mode.

In accordance with another aspect of the present invention, a method for transmitting scheduling information of a central coordinator in a wireless communication system is provided. The method includes receiving a response signal for downlink data and channel state information from a base station, determining a scheduling metric for determining a scheduling priority based on the response signal and the channel state information, performing scheduling for user equipments connected to the base station based on the determined scheduling metric, and transmitting a result of the scheduling to the base station.

In accordance with another aspect of the present invention, a base station in a wireless communication system is provided. The base station includes a receiver for receiving a response signal for downlink data and channel state information from a user equipment, a central interface unit for transmitting the response signal and the channel state information to a central coordinator and receiving scheduling information from the central coordinator, a controller for determining an interference control mode determined according to whether interference of adjacent base stations is controlled, based on the scheduling information, and a transmitter for transmitting data to the user terminal by using an MCS level according to the determined interference control mode.

In accordance with another aspect of the present invention, a central coordinator in a wireless communication system is provided. The central coordinator includes a base station interface for receiving a response signal for downlink data and channel state information from a base station, a scheduler for determining a scheduling metric for determining a scheduling priority based on the response signal and the channel state information, performing scheduling for user equipments connected to the base station based on the determined scheduling metric, and outputting a result of the scheduling to the base station interface to transmit the result of the scheduling to the base station.

The present invention has an advantage of more clearly determining a channel state of a receiver according to an interference control state in a wireless communication system. In addition, the present invention improves data transmission efficiency by determining an MCS level according to the clearly determined channel state of the receiver.

Other aspects, advantages, and salient features of the invention will become apparent to those skilled in the art from the following detailed description, which, taken in conjunction with the annexed drawings, discloses exemplary embodiments of the invention.

BRIEF DESCRIPTION OF THE DRAWINGS

The above and other aspects, features, and advantages of certain exemplary embodiments of the present invention will be more apparent from the following description taken in conjunction with the accompanying drawings, in which.

Throughout the drawings, like reference numerals will be understood to refer to like parts, components, and structures.

DETAILED DESCRIPTION OF EXEMPLARY EMBODIMENTS

Figure 1:
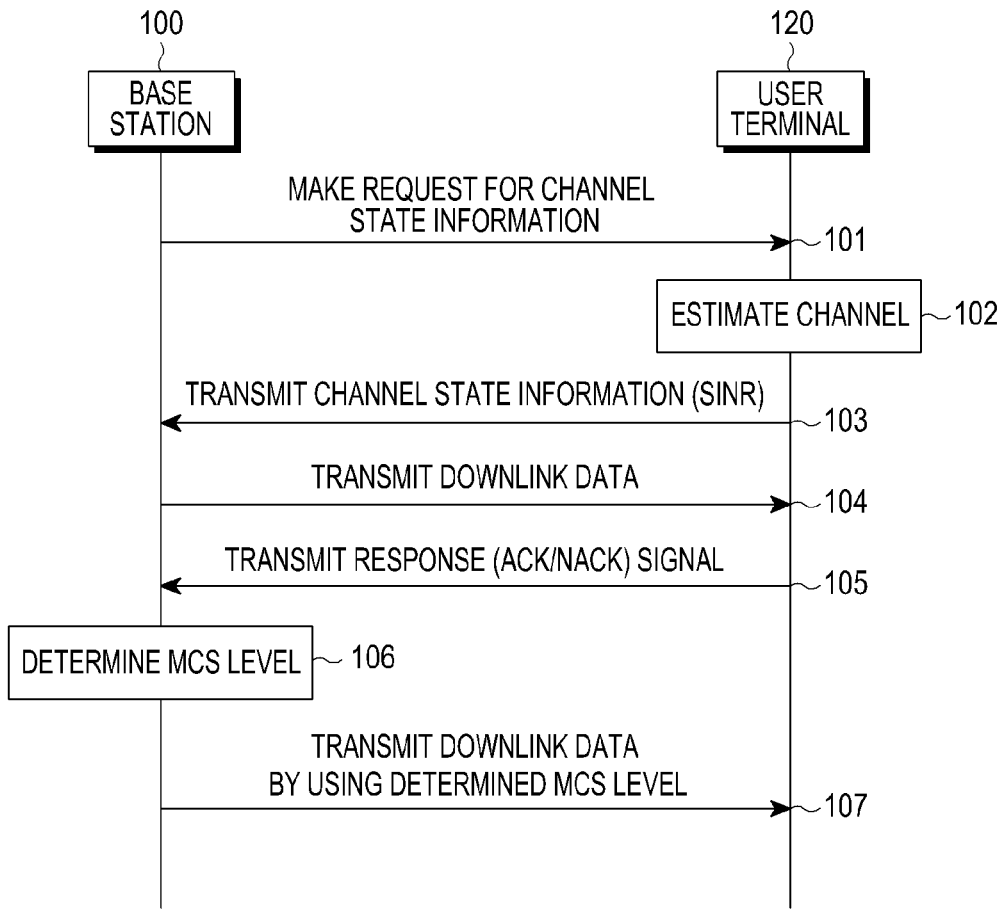
FIG. 1 is a signal flowchart illustrating a data transmission method in a wireless communication system according to the related art.

The following description with reference to the accompanying drawings is provided to assist in a comprehensive understanding of exemplary embodiments of the invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. In addition, descriptions of well-known functions and constructions may be omitted for clarity and conciseness.

The terms and words used in the following description and claims are not limited to the bibliographical meanings, but, are merely used by the inventor to enable a clear and consistent understanding of the invention. Accordingly, it should be apparent to those skilled in the art that the following description of exemplary embodiments of the present invention is provided for illustration purpose only and not for the purpose of limiting the invention as defined by the appended claims and their equivalents.

It is to be understood that the singular forms "a," "an," and "the" include plural referents unless the context clearly dictates otherwise. Thus, for example, reference to "a component surface" includes reference to one or more of such surfaces.

By the term "substantially" it is meant that the recited characteristic, parameter, or value need not be achieved exactly, but that deviations or variations, including for example, tolerances, measurement error, measurement accuracy limitations and other factors known to those of skill in the art, may occur in amounts that do not preclude the effect the characteristic was intended to provide.

Exemplary embodiments of the present invention provide a method and an apparatus for transmitting data in a wireless communication system. More specifically, exemplary embodiments of the present invention provide a method and an apparatus for transmitting data to a receiver by a transmitter in a wireless communication system, receiving a response signal indicating whether the transmitted data has been successfully received and channel state information from the receiver, determining an interference control mode set at a time when the data is transmitted, changing the channel state information based on the determined interference control mode and the response signal, and transmitting data to the receiver by using a Modulation and Coding Scheme (MCS) level corresponding to the changed channel state information.

In the following description, a case where the transmitter is a base station and the receiver is a user equipment will be discussed as an example. However, it will be apparent to those skilled in the art that the transmitter and the receiver are not limited to the base station and the user equipment, respectively, and may be variously changed.

Prior to the description of exemplary embodiments of the present invention, a method and an apparatus for transmitting data in a wireless communication system of the related art will be described.

FIG. 1 is a signal flowchart illustrating a data transmission method in a wireless communication system according to the related art.

Referring to FIG. 1, a base station 100 makes a request for channel state information to a user equipment 120 in step 101. Thereafter, the user equipment 120 estimates a channel by using a pilot signal or a preamble signal transmitted from the base station 100 in step 102 and transmits channel state information containing state information on the estimated channel to the base station 100 in step 103.

The channel state information may contain a channel coefficient or a Signal to Interference plus Noise Ratio (SINR), but generally contains the SINR that considers system complexity. Accordingly, hereinafter, it should be noted that the channel state information may be used interchangeably with the SINR.

The base station 100 transmits downlink data to the user equipment 120 in step 104, and receives a response signal of the transmitted downlink data, that is, an Acknowledgement (ACK)/Negative Acknowledgement (NACK) signal, in step 105.

Furthermore, the base station 100 determines an MCS level based on the received SINR or ACK/NACK signal in step 106, and transmits downlink data to the user equipment 120 by using the determined MCS level in step 107.

In an exemplary implementation of step 106, the base station 100 determines the MCS level with reference to a preset MCS determination table by using the SINR. However, the MCS determination table cannot completely reflect all channel environments in which an actual wireless communication system operates.

Accordingly, the base station 100 uses an adaptive channel state information control (hereinafter, referred to as an Outer-Loop Rate Control (OLRC)) technique. The OLRC technique refers to a technique through which the base station 100 changes a value of the SINR received from the user equipment 120 by using the ACK/NACK signal received from the user equipment 120.

More specifically, when the base station 100 transmits the downlink data and receives the ACK signal from the user equipment 120, the base station 100 changes the SINR value by using Equation (1) below. Furthermore, when the base station 100 transmits the downlink data and receives the NACK signal from the user equipment 120, the base station 100 changes the SINR value by using Equation (2) below.

$$SINR\_out=SINR\_in+Offset_k$$

$$Offset_k=Offset_{k-1}+UP$$

$$UP=DOWN*(Target\ PER)/(1-Target\ PER) \quad (1)$$

$$SINR\_out=SINR\_in+Offset_k$$

$$Offset_k=Offset_{k-1}-DOWN \quad (2)$$

In Equations (1) and (2), SINR_in denotes the SINR value received from the user equipment 120, SINR_out denotes the changed SINR value, Target Packet Error Rate (PER) denotes a target packet error probability, $Offset_{k-1}$ denotes an offset value used for changing SINR_in at a time of k−1, $Offset_k$ denotes an offset value used for changing SINR_in at a time of k, DOWN denotes a preset value, and UP denotes a value determined based on DOWN and Target PER.

As shown in Equations (1) and (2), the base station 100 increases SINR_in by UP when receiving the ACK signal, and decreases SINR_in by DOWN when receiving the NACK signal.

When the SINR value is changed in the way described above, the base station 100 determines an MCS level corresponding to the changed SINR value, and transmits downlink data to the user equipment 120 by using the determined MCS level.

Hereinafter, an MCS level determiner used for determining the MCS level of the base station 100 will be described with reference to FIG. 2.

Figure 2:
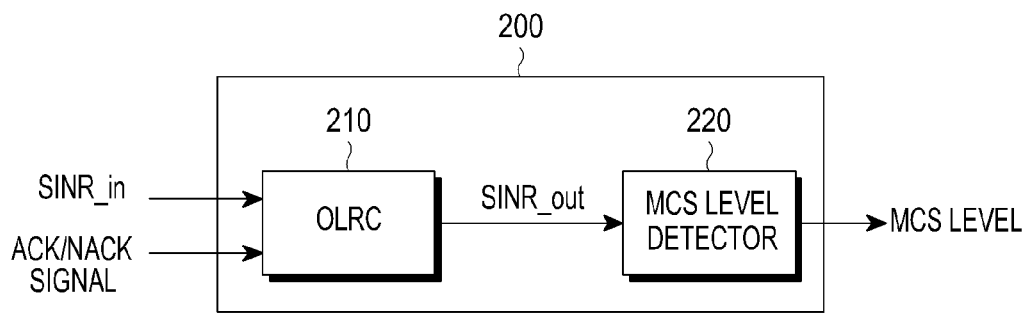
FIG. 2 is a block diagram of a Modulation and Coding Scheme (MCS) level determiner included in a base station in a wireless communication system according to the related art.

FIG. 2 is a block diagram of an MCS level determiner included in a base station in a wireless communication system according to the related art.

Referring to FIG. 2, an MCS level determiner 200 includes an OLRC unit 210 and an MCS level detector 220.

When the SINR value is received from the user equipment, the OLRC unit 210 changes the received SINR value by using one of Equations (1) and (2) according to whether the ACK signal is received or the NACK signal is received for the transmitted downlink data. Furthermore, the OLRC unit 210 outputs the changed SINR value to the MCS level detector 200.

Thereafter, the MCS level detector 200 detects an MCS level corresponding to the changed SINR value from a preset MCS level determination table and outputs the MCS level, so that the detected MCS level may be used for transmitting the downlink data to the user equipment.

As described above, in the wireless communication system of the related art, the base station changes the SINR received from the user equipment only based on whether the ACK signal or the NACK signal is received without considering interference in a channel environment to determine the MCS level.

Accordingly, an exemplary embodiment of the present invention provides a method and an apparatus which adaptively determine an MCS level of a channel state of the user equipment by more accurately determining the channel state of the user equipment by considering interference.

Figure 3:
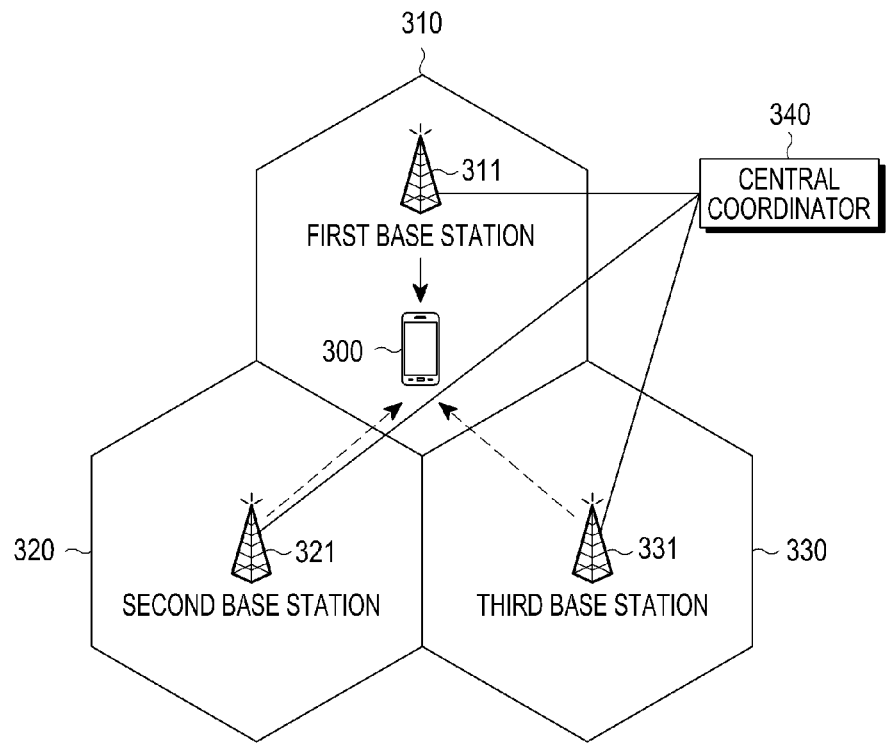
FIG. 3 is a diagram illustrating a wireless communication system according to an exemplary embodiment of the present invention.

FIG. 3 is a diagram illustrating a wireless communication system according to an exemplary embodiment of the present invention.

Referring to FIG. 3, the wireless communication system includes a user equipment 300, a plurality of base stations (for example, a first base station 311, a second base station 321, and a third base station 331) controlling a plurality of cells (for example, a first cell 310, a second cell 320, and a third cell 330), and a central coordinator 340 for controlling the plurality of base stations. Although it is described that the plurality of cells include three cells, and the plurality of base stations include three base stations in FIG. 3, the numbers of cells and base stations are not limited thereto and may vary.

In the wireless communication system illustrated in FIG. 3, inter-cell interference is generated as the cells are adjacent to each other. For example, in downlink transmission/reception, when the second base station 321 and the third base station 331 perform a signal transmission operation at the same time as the first base station 311 transmits a signal to the user equipment 300 included in the first cell 310, the signals transmitted from the second base station 321 and the third base station 331 may act as interference signals to the user equipment 300. When the inter-cell interference is generated, communication quality deteriorates, and throughputs of signal transmission/reception decrease.

Accordingly, in order to address the above problems, exemplary embodiments of the present invention may use various interference control methods. For example, an interference control method of not allowing two or more base stations to simultaneously communicate at a particular time section by performing scheduling according to signal and data transmission/reception through communication among the first base station 311, the second base station 321, and the third base station 331 may be used. Furthermore, an interference control method of controlling transmission power of the remaining base stations except for the base station transmitting a signal or data among the first base station 311, the second base station 321, and the third base station 331 according to scheduling of the central coordinator 340 during a corresponding time section may be used. In this case, the central coordinator 340 may select an optimal user equipment for each cell by considering a channel state of the user equipment and perform scheduling of allocating radio resources by considering inter-cell interference. Furthermore, each of the first base station 311, the second base station 321, and the third base station 331 may receive a result of the scheduling from the central coordinator 340, and through the scheduling result each cell may determine the MCS level based on an interference control mode.

Hereinafter, an internal configuration of a base station according to an exemplary embodiment of the present invention will be described with reference to FIG. 4.

Figure 4:
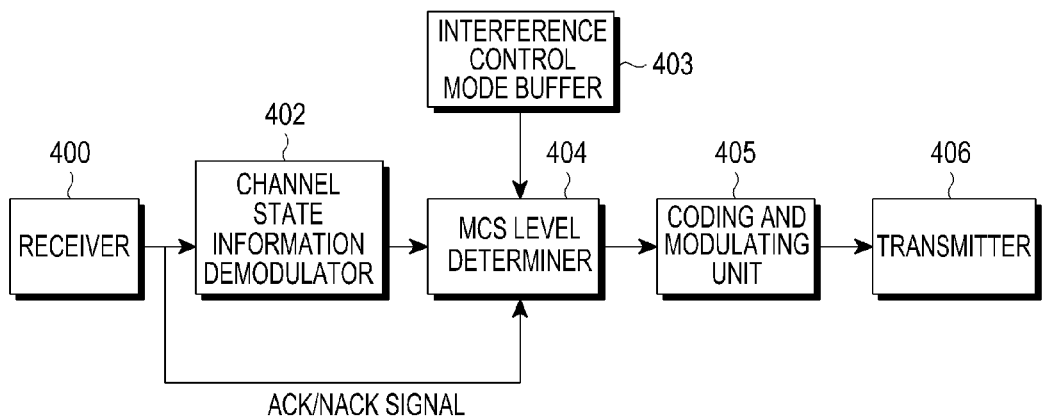
FIG. 4 is a block diagram of a base station according to an exemplary embodiment of the present invention.

FIG. 4 is a block diagram of a base station according to an exemplary embodiment of the present invention.

Referring to FIG. 4, the base station includes a receiver 400, a channel state information demodulator 402, an interference control mode buffer 403, an MCS level determiner 404, a coding and modulating unit 405, and a transmitter 406.

Although not illustrated in FIG. 4, all of the receiver 400, the channel state information demodulator 402, the interference control mode buffer 403, the MCS level determiner 404, the coding and modulating unit 405, and the transmitter 406 perform corresponding operations under a control of a controller. Furthermore, the base station may include a separate physical component for communicating with the central coordinator.

The receiver 400 receives channel state information from the user equipment. The channel state information may be received from the user equipment periodically or according to a request of the base station. Furthermore, the receiver 400 receives a response signal, that is, one of an ACK signal and a NACK signal, which indicates whether previously transmitted downlink data has been successfully received, from the user equipment and outputs the received signal to the MCS level determiner 404.

The channel state information demodulator 405 demodulates the received channel state information and acquires an SINR value contained in the channel state information. Furthermore, the channel state information demodulator 405 outputs the acquired SINR value to the MCS level determiner 404.

The interference control mode buffer 403 stores an interference control mode at a time when the downlink data is transmitted. Here, the interference control mode may be acquired based on scheduling information received from the central coordinator and corresponds to one of N interference control modes. Specifically, when the number of adjacent base stations which can give interference to the base station is k, N becomes 2k, and the N interference control modes are determined according to interference control states of k base stations. For example, when k is 2, the number of interference control modes is 4, and the interference control modes may be divided as shown in Table 1 according to whether interference of two base stations (for example, the first base station and the second base station) is controlled. Furthermore, all of the N interference control modes may be directly used or only some (for example, two interference control modes) of the N interference control modes may be used.

TABLE 1

| Interference control mode (N = $2^k$) | Whether adjacent base station interference is controlled |
|---|---|
| 0 | First and second base station interference is not controlled |
| 1 | First base station interference is controlled |
| 2 | Second base station interference is controlled |
| 3 | First and second base station interference is controlled |

Referring to Table 1 above, the interference control mode (0) means that interference of the first and second base stations is not controlled, the interference control mode (1) means that interference of the first base station is controlled, the interference control mode (2) means that interference of the second base station is controlled, and the interference control mode (3) means that interference of the first and second base stations is controlled.

Here, the interference control refers to an operation of reducing transmission power for downlink data transmission of the first or second base station to a value equal to or smaller than a preset value while the base station transmits the downlink data to the user equipment or controlling the first or second base station not to transmit the downlink data during a time section when the base station transmits the downlink data. The interference control may be performed according to the scheduling result of the central coordinator. An exemplary scheduling operation of the central coordinator will be described below.

When the ACK/NACK signal received at time t is input into the receiver 400, the MCS level determiner 404 reads information on the interference control mode corresponding to time t-k which is a downlink data transmission time from the interference control mode buffer 403. Here, k denotes a time taken until the ACK/NACK signal is received after the corresponding downlink data is transmitted.

The MCS level determiner 404 changes the SINR value output from the channel state information demodulator 402 based on the ACK/NACK signal received at the time t and the information on the interference control mode corresponding to the time t-k. Furthermore, the MCS level determiner 404 determines the MCS level corresponding to the changed SINR value based on the MCS level determination table, which may be expressed as, for example, Table 2.

TABLE 2

| MCS level | SINR |
|---|---|
| 0 | $SINR < SINR_0$ |
| 1 | $SINR_0 < SINR < SINR_1$ |
| ... | ... |
| N | $SINR_{n-1} < SINR$ |

As shown in Table 2, the MCS level determination table is configured in a type where the MCS level corresponds to each size range of the SINR value. When the MCS level is determined, the MCS level determiner 404 outputs information on the determined MCS level to the coding and modulating unit 405.

The coding and modulating unit 405 codes and modulates downlink data to be transmitted to the user equipment according to the determined MCS level. Thereafter, the transmitter 406 transmits the coded and modulated downlink data to the user equipment.

Hereinafter, an internal configuration of the MCS level determiner 404 will be described with reference to FIG. 5.

Figure 5:
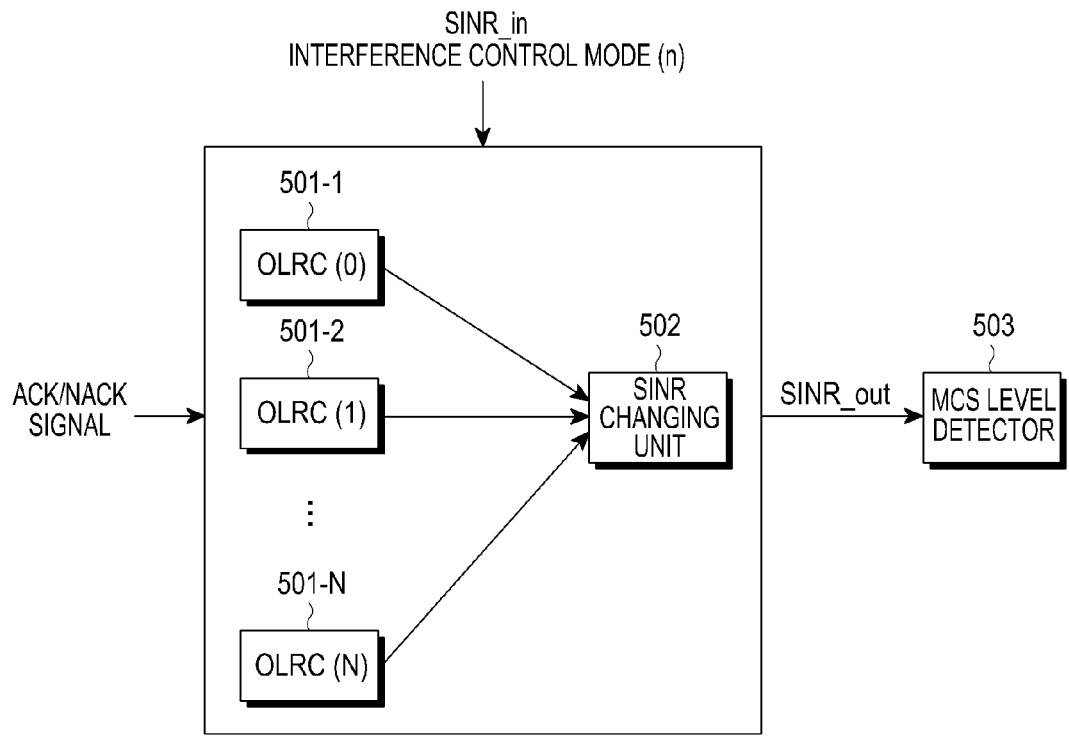
FIG. 5 is a block diagram of an MCS level determiner included in a base station according to an exemplary embodiment of the present invention.

FIG. 5 is a block diagram of an MCS level determiner included in a base station according to an exemplary embodiment of the present invention.

Referring to FIG. 5, the MCS level determiner includes N OLRC units 501-1 through 501-N, an SINR changing unit 502, and an MCS level detector 503.

The OLRC (0) unit 501-1 through the OLRC (N) unit 501-N correspond to interference control mode (0) through interference control mode (n), respectively, and determine an offset value used for changing an input SINR value according to the corresponding interference control mode. For example, when information on one of the n interference control modes is input, the OLRC unit corresponding to the input interference control mode among the OLRC (0) unit 501-1 through the OLRC (N) unit 501-N determines the offset value by using Equations (3) and (4) according to whether the ACK signal is received or the NACK signal is received.

Equation (3) below refers to an equation for changing the offset value used for changing the SINR value in the interference control mode (n) when the ACK signal is received, and Equation (4) below refers to an equation for changing the offset value used for changing the SINR value in the interference control mode (n) when the NACK signal is received.

$$\text{Offset}(n)_k = \text{Offset}(n)_{k-1} + \text{UP}$$

$$\text{UP} = \text{DOWN} * (\text{Target PER})/(1 - \text{Target PER}) \quad (3)$$

$$\text{Offset}(n)_k = \text{Offset}(n)_{k-1} - \text{DOWN} \quad (4)$$

In Equations (3) and (4) above, Target PER denotes a target packet error probability, $\text{Offset}(n)_{k-1}$ denotes an offset value used for changing an SINR value at a time k−1 in the interference control mode (n), $\text{Offset}(n)_k$ denotes an offset value used for changing an SINR value at a time k in the interference control mode (n), DOWN denotes a preset value, and UP denotes a value determined based on DOWN and Target PER.

For example, when the ACK signal is received at the time t and the interference control mode at a time t-w corresponds to the interference control mode (1), the OLRC (1) unit 501-2 corresponding to the interference control mode (1) may determine the offset value for changing the input SINR value by using Equation (3). When the NACK signal is received in the same situation, the OLRC (1) unit 501-2 may determine the offset value for changing the input SINR value by using Equation (4).

Meanwhile, the remaining OLRC units which do not correspond to the interference control mode (1) may determine the offset value by using Equations (5) and (6) below. For example, the remaining OLRC units determine the offset value by using Equation (5) below when the ACK signal is received in the interference control mode (1), and determines the offset value by using Equation (6) below when the NACK signal is received in the interference control mode (1).

$$\text{Offset}(m)_k = \text{Offset}(m)_{k-1} + \text{UP\_non}, \; m \neq n \quad (5)$$

$$\text{Offset}(m)_k = \text{Offset}(m)_{k-1} - \text{DOWN\_non}, \; m \neq n \quad (6)$$

In Equations (5) and (6), $\text{Offset}(m)_{k-1}$ denotes an offset value used for changing an SINR value at a time k−1 in an interference control mode (m) different from the interference control mode (n), $\text{Offset}(m)_k$ denotes an offset value used for changing an SINR value at a time k in the interference control mode (m), and UP_non and DOWN_non denote preset values.

The output from the component corresponding to the interference control mode among the OLRC (0) unit 501-1 to the OLRC (N) unit 501-N, that is, the offset value is output to the SINR changing unit 502. The SINR changing unit 502 changes the SINR value input using the input offset value by using Equation (7) below.

$$\text{SINR\_out} = \text{SINR\_in}(n) + \text{offset}(n) \quad (7)$$

In Equation (7), SINR_in (n) denotes an SINR value input into the MCS level determiner, SINR_out denotes a changed SINR value, and Offset(n) denotes an offset value corresponding to an interference control mode input into the SINR changing unit 502.

When the SINR value is changed as described above, the SINR changing unit 502 outputs the changed SINR value to the MCS level detector 503. Thereafter, the MCS level detector 503 detects the MCS level corresponding to the changed SINR value from the MCS level determination table shown in Table 1 and determines the detected MCS level as the MCS level for the user equipment.

Thereafter, an internal configuration of the central coordinator according to an exemplary embodiment of the present invention will be described with reference to FIG. 6.

Figure 6:
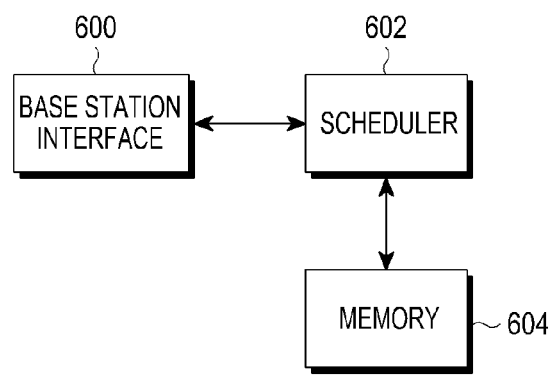
FIG. 6 is a block diagram of a central coordinator according to an exemplary embodiment of the present invention.

FIG. 6 is a block diagram of a central coordinator according to an exemplary embodiment of the present invention.

Referring to FIG. 6, the central coordinator includes a base station interface 600, a scheduler 602, and a memory 604.

The base station interface 600 is a component for communicating with each of a plurality of base stations and receives channel state information and a response signal from each of the plurality of base stations. The channel state information indicates a channel state of the user equipment, which is received from each base station periodically or upon request, and may contain the SINR value. Furthermore, the response signal may be one of the ACK signal and the NACK signal, which indicates whether the downlink data has been successfully received.

The scheduler 602 determines a scheduling metric used for performing scheduling for each base station based on the channel state information and the response signal. The scheduling metric refers to a reference value for determining a resource allocation priority, and may be, for example, a Proportional Fairness (PF) metric or the like. Furthermore, the scheduler 602 may change the SINR value contained in the channel state information based on whether the response signal is the ACK signal or the NACK signal and determine the changed SINR value as the scheduling metric.

For example, the scheduler 602 may increase the SINR value by UP when the response signal is the ACK signal, and decrease the SINR value by DOWN when the response signal is the NACK signal. Here, the offset value (i.e., UP or DOWN) used for changing the SINR value may be provided by each base station or a preset value may be used.

When the SINR value is changed as described above, the scheduler 602 performs scheduling for each of the user equipments of the plurality of base stations based on the changed SINR value. At this time, the scheduler 602 performs scheduling considering inter-cell interference and determines the interference control mode to be used for each time section according to a result of the scheduling. Accordingly, the scheduler 602 transmits the result of the scheduling to each base station through the base station interface 600 so that the base station can determine the MCS level by considering the interference control mode.

The memory 604 stores various information generated according to an operation of the central coordinator. For example, the memory 604 stores the channel state information and the response signal received from each base station and the result of the scheduling.

Hereinafter, an internal configuration of the scheduler 602 will be described with reference to FIG. 7.

Figure 7:
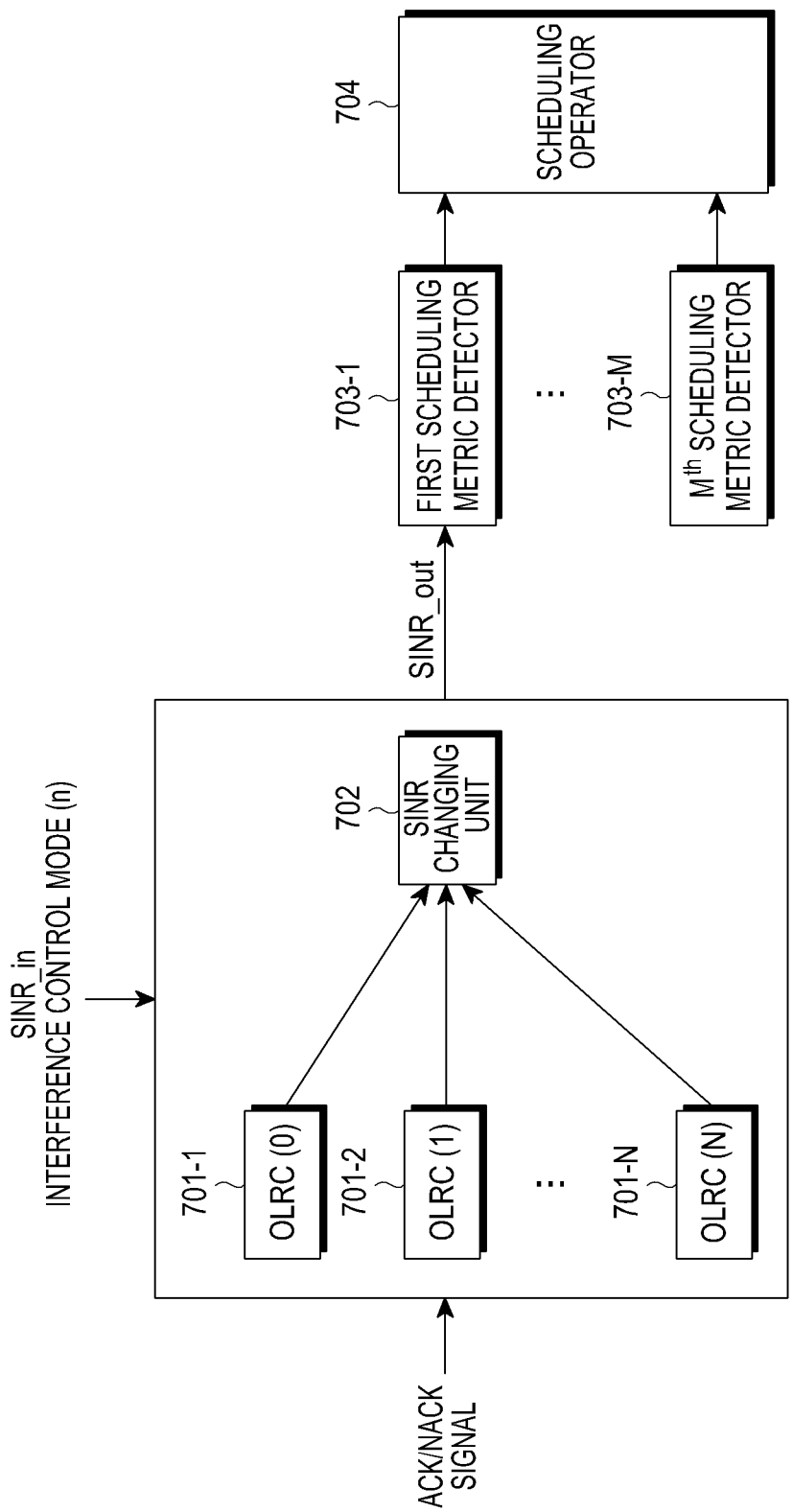
FIG. 7 is a block diagram of a scheduler included in a central coordinator according to an exemplary embodiment of the present invention.

FIG. 7 is a block diagram of a scheduler included in a central coordinator according to an exemplary embodiment of the present invention.

Referring to FIG. 7, the scheduler includes N OLRC units 701-1 through 701-N, an SINR changing unit 702, M scheduling metric detectors 703-1 through 703-M, and a scheduling operator 704.

The OLRC (0) unit 701-1 through the OLRC (N) unit 701-N correspond to the interference control mode (0) through the interference control mode (n), respectively, and determine the offset value used for changing the input SINR value according to the corresponding interference control mode. For example, when information on one of the n interference control modes is input, the OLRC unit corresponding to the input interference control mode among the OLRC (0) unit 701-1 through the OLRC (N) unit 701-N determines the offset value according to whether the ACK signal is received or the NACK signal is received.

Similar to that of the base station, Equations (3) and (4) may be used for determining the offset value, and UP and DOWN used for changing the SINR value in Equations (3) and (4) may be provided by each base station or preset values may be used. Alternatively, the offset value used for changing the SINR value may be directly provided by each base station without the operation for determining the offset value as described above.

Meanwhile, the remaining OLRC units which do not correspond to the input interference control mode may determine the offset value by using Equations (5) and (6). In this case, UP_non and DOWN_non used for changing the SINR value in Equations (5) and (6) may be provided by each base station, or preset values may be used. Alternatively, the offset value used for changing the SINR value may be directly provided by each base station without the operation for determining the offset value as described above.

The output from the component corresponding to the corresponding interference control mode among the OLRC (0) unit 701-1 through the OLRC (N) unit 701-N, that is, the offset value is output to the SINR changing unit 702. Thereafter, the SINR changing unit 702 changes the SINR value input using the input offset value by using Equation (7).

When the SINR value is changed as described above, the SINR changing unit 702 outputs the changed SINR value to corresponding one of the M scheduling metric detectors 703-1 through 703-M.

The M scheduling metric detectors 703-1 through 703-M correspond to M base stations and detect the changed SINR value of the user equipment connected to each of the M base stations as a scheduling metric. For example, the first scheduling metric detector 703-1 related to the first base station of the M base stations detects the changed SINR value of the user equipment connected to the first base station.

The scheduling metrics detected by the M scheduling metric detectors 703-1 through 703-M are output to the scheduling operator 704. Thereafter, the scheduling operator 704 performs scheduling based on the scheduling metric, that is, the changed SINR value for user equipments of each of the M base stations. Furthermore, the scheduling operator 704 outputs a result of the scheduling. At this time, the result of the scheduling is transmitted to each of the M base stations. The result of the scheduling may contain interference control information for each base station. Accordingly, each of the M base stations can transmit/receive data by using the time and the radio resource according to the result of the scheduling based on the MCS level considering the interference control mode.

Figure 8:
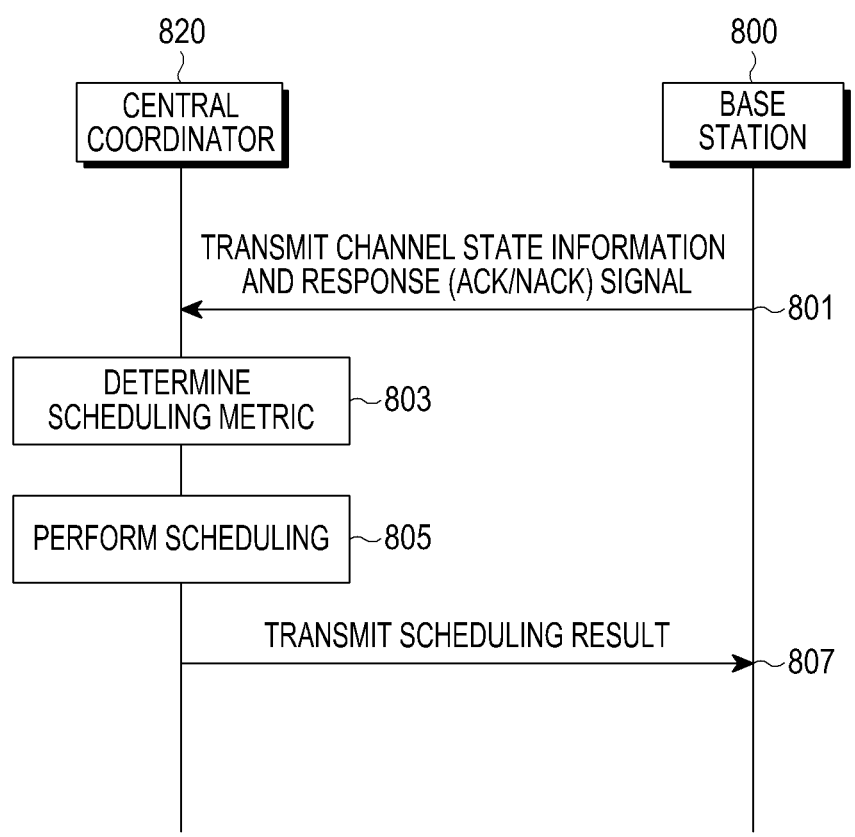
FIG. 8 is a signal flowchart between a central coordinator and a base station according to an exemplary embodiment of the present invention.

FIG. 8 is a signal flowchart between a central coordinator and a base station according to an exemplary embodiment of the present invention.

Referring to FIG. 8, a base station 800 transmits channel state information (i.e., a SINR) and a response signal (i.e., an ACK/NACK signal) received from the user equipment to a central coordinator 820 in step 801. Subsequently, the central coordinator 820 determines a scheduling metric based on the received channel state information and response signal in step 803. The scheduling metric refers to a reference value for determining a scheduling priority and may be, for example, an SINR value changed considering the response signal.

When the scheduling metric is determined, the central coordinator 820 performs scheduling by using the determined scheduling metric in step 805. Furthermore, the central coordinator 820 transmits a result of the scheduling to the base station 800 in step 807. Thereafter, the base station 800 may transmit data to user equipments within a cell by using the time and radio resource according to the result of the scheduling and determine the MCS level based on information on the interference control mode contained in the result of the scheduling and use the determined MCS level. Thereafter, a scheduling operation of the central coordinator 820 will be described with reference to FIG. 9.

Figure 9:
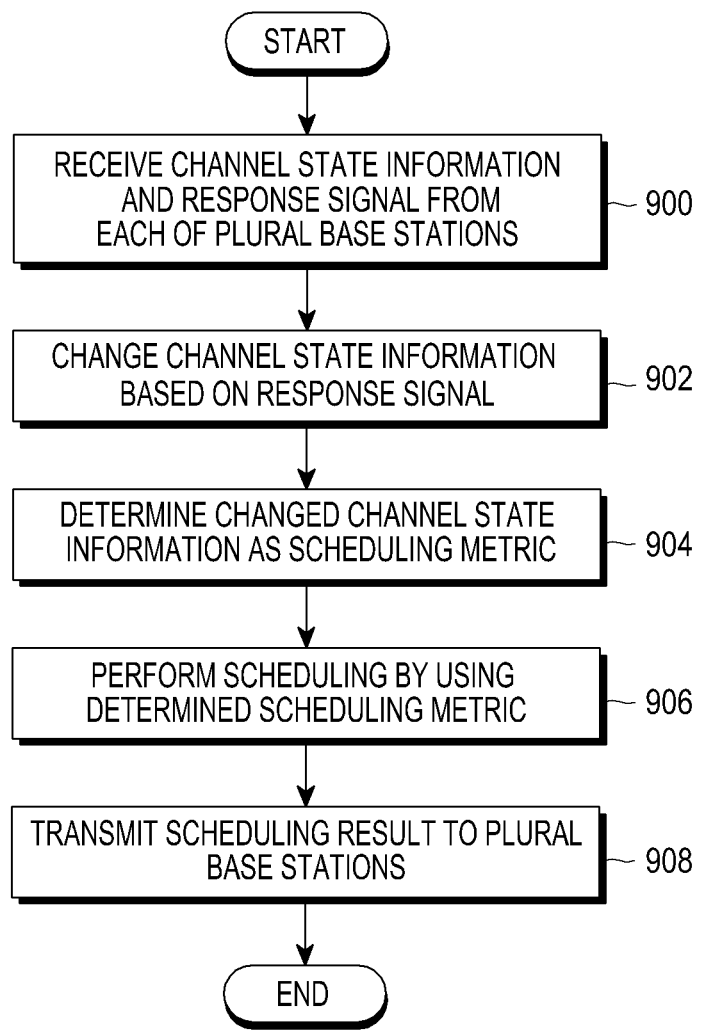
FIG. 9 is a flowchart illustrating a process in which a central coordinator transmits scheduling information according to an exemplary embodiment of the present invention.

FIG. 9 is a flowchart illustrating a process in which a central coordinator transmits scheduling information according to an exemplary embodiment of the present invention.

Referring to FIG. 9, the central coordinator receives channel state information and a response signal from each of a plurality of base stations in step 900. Furthermore, the central coordinator changes the received channel state information based on the response signal in step 902, and determines the changed channel state information as a scheduling metric in step 904. The scheduling metric may be determined for each of the plurality of base stations.

Subsequently, the central coordinator performs scheduling of the user equipments connected to each base station by using the determined scheduling metric in step 906, and transmits a scheduling result containing resource allocation information and information on the interference control mode to the plurality of base stations in step 908.

Hereinafter, a process in which the base station determines the MCS level will be described with reference to FIG. 10.

Figure 10:
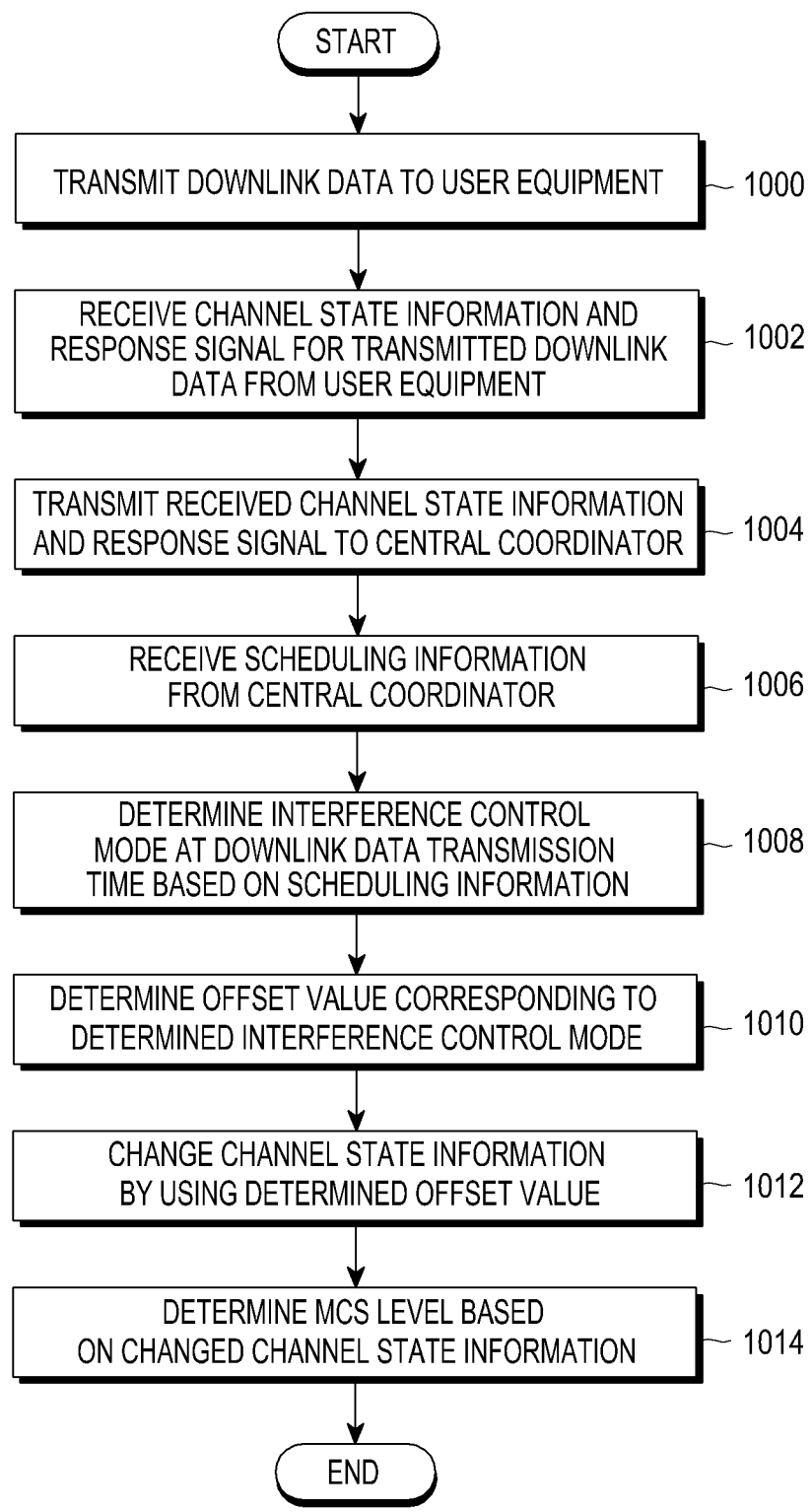
FIG. 10 is a flowchart illustrating a process in which a base station determines an MCS level according to an exemplary embodiment of the present invention.

FIG. 10 is a flowchart illustrating a process in which a base station determines an MCS level according to an exemplary embodiment of the present invention.

Referring to FIG. 10, the base station transmits downlink data to the user equipment in step 1000. Furthermore, the base station receives the channel state information and one of the ACK signal and the NACK signal, which indicates whether the transmitted downlink data has been successfully received, from the user equipment as the response signal in step 1002.

The base station transmits the received channel state information and response signal to the central coordinator in step 1004, and receives scheduling information from the central coordinator in step 1006. Subsequently, the base station determines the interference control mode at a time when the downlink data is transmitted, based on the received scheduling information in step 1008. The interference control mode refers to a mode in which interference received from a plurality of adjacent base stations is controlled, and represents one of the plurality of interference control modes determined according to whether interference of each of the plurality of adjacent base stations is controlled.

Here, when one of the ACK signal and the NACK signal is received at a first time, the base station may determine the interference control mode set at a second time which is a specific time earlier than the first time as the interference control mode at the time when the downlink data is transmitted. The specific time includes a time taken until the response signal is received after the downlink data is transmitted.

When the interference control mode is determined, the base station determines an offset value corresponding to the determined interference control mode in step 1010. The base station determines the offset value corresponding to the determined interference control mode based on whether the response signal is the ACK signal or the NACK signal. For example, the base station determines the offset value by using Equation (3) when the response signal is the ACK signal, and determines the offset value by using Equation (4) when the response signal is the NACK signal.

Meanwhile, the base station may additionally determine the offset value which does not correspond to the determined interference control mode. For example, the base station may additionally determine the offset value for changing the channel state information to be used in another interference control mode different from the determined interference control mode based on whether the response signal is the ACK signal or the NACK signal.

The base station changes the received channel state information by using the determined offset value in step 1012. Furthermore, the base station determines the MCS level based on the changed channel state information in step 1014.

While the invention has been shown and described with reference to certain exemplary embodiments thereof, it will be understood by those skilled in the art that various changes in form and details may be made therein without departing from the spirit and scope of the invention as defined by the appended claims and their equivalents.

What is claimed is:

1. A method for transmitting data by a base station in a wireless communication system, the method comprising:
    transmitting, to a central coordinator controlling the base station and adjacent base stations, a response signal for downlink data and channel state information received from a user equipment;
    receiving scheduling information from the central coordinator, the scheduling information comprising information on an interference control mode;
    determining the interference control mode at a time when the downlink data is transmitted, based on the scheduling information; and
    transmitting data to the user equipment by using a modulation and coding scheme (MCS) level determined based on the interference control mode,
    wherein the interference control mode indicating whether downlink data transmission of each of the adjacent base stations and the base station is controlled when the downlink data is transmitted to the user equipment.

2. The method of claim 1, wherein the transmitting of the data comprises:
    changing the channel state information based on the determined interference control mode and the response signal;
    determining the MCS level corresponding to the changed channel state information; and
    transmitting the data to the user equipment by using the determined MCS level.

3. The method of claim 2, wherein the changing of the channel state information comprises:
    determining an offset value corresponding to the determined interference control mode based on whether the response signal includes one of an acknowledgement (ACK) signal and a negative acknowledgement (NACK) signal; and
    changing the channel state information by using the determined offset value.

4. The method of claim 3, wherein the determining of the offset value comprises:
    when the response signal includes the ACK signal, generating a second control value by using a target packet error probability/rate and a preset first control value;
    updating an offset value used in accordance with the determined interference control mode at a previous time by using the generated second control value; and
    determining the updated offset value as the offset value corresponding to the determined interference control mode.

5. The method of claim 1, wherein the determining of the interference control mode comprises, when the response signal is received at a first time, determining the interference control mode at a second time which is a specific time earlier than the first time, and the specific time includes a time taken until the response signal is received after the downlink data is transmitted.

6. A method for transmitting scheduling information of a central coordinator in a wireless communication system, the method comprising:
    receiving, from a base station, a response signal for downlink data and channel state information;
    determining a scheduling metric for determining a scheduling priority based on the response signal and the channel state information;
    performing scheduling for user equipments connected to the base station based on the determined scheduling metric; and
    transmitting a result of the scheduling to the base station,
    wherein the result of the scheduling comprises information on an interference control mode indicating whether downlink data transmission of each of the adjacent base stations and the base station is controlled when a downlink data is transmitted to the user equipment by the base station.

7. The method of claim 6, wherein the determining of the scheduling metric comprises:
    changing the channel state information based on whether the response signal includes one of an acknowledgement (ACK) signal and a negative acknowledgement (NACK) signal; and
    determining the changed channel state information as the scheduling metric.

8. The method of claim 7, wherein the changing of the channel state information comprises:
    determining an offset value for changing the channel state information based on whether the response signal includes one of the ACK signal and the NACK signal; and
    changing the channel state information by using the determined offset value.

9. The method of claim 8, wherein the determining of the offset value comprises determining the offset value, determined based on whether the response signal includes one of the ACK signal and the NACK signal among offset values received from the base station, as the offset value for changing the channel state information.

10. The method of claim 8, wherein the determining of the offset value comprises determining one of a first offset value stored to change the channel state information when the response signal includes the ACK signal and a second offset stored to change the channel state information when the response signal includes the NACK signal as the offset value for changing the channel state information.

11. A base station in a wireless communication system, the system comprising:
    a receiver configured to receive, from a user equipment, a response signal for downlink data and channel state information;
    a central interface device configured to:

transmit the response signal and the channel state information to a central coordinator controlling the base station and adjacent base stations, and receive scheduling information from the central coordinator, the scheduling information comprising information on an interference control mode;

a processor configured to determine the interference control mode at a time when the downlink data is transmitted, based on the scheduling information; and a transmitter configured to transmit data to the user terminal by using a modulation and coding scheme (MCS) level based on the interference control mode, wherein the interference control mode indicating whether downlink data transmission of each of the adjacent base stations and the base station is controlled when the downlink data is transmitted to the user equipment.

12. The base station of claim 11, wherein the processor is further configured to:

change the channel state information based on the determined interference control mode and the response signal, determine the MCS level corresponding to the changed channel state information, and control the transmitter to transmit the data to the user equipment by using the determined MCS level.

13. The base station of claim 12, wherein the processor is further configured to:

determine an offset value corresponding to the determined interference control mode based on whether the response signal includes one of an acknowledgement (ACK) signal and a negative acknowledgement (NACK) signal, and change the channel state information by using the determined offset value.

14. The base station of claim 13, wherein, when the response signal includes the ACK signal, the processor is further configured to:

generate a second control value by using a target packet error probability/rate and a preset first control value, update an offset value used in accordance with the determined interference control mode at a previous time by using the generated second control value, and determine the updated offset value as the offset value corresponding to the determined interference control mode.

15. The base station of claim 11, wherein, when the response signal is received at a first time, the processor is further configured to determine the interference control mode at a second time which is a specific time earlier than the first time, and the specific time includes a time taken until the response signal is received after the downlink data is transmitted.

16. A central coordinator in a wireless communication system, the central coordinator comprising:

a base station interface configured to receive, from a base station, a response signal for downlink data and channel state information;

a scheduler configured to:

determine a scheduling metric for determining a scheduling priority based on the response signal and the channel state information, perform scheduling for user equipments connected to the base station based on the determined scheduling metric, and output a result of the scheduling to the base station interface to transmit the result of the scheduling to the base station, wherein the result of the scheduling comprises information an interference control mode indicating whether downlink data transmission of each of the adjacent base stations and the base station is controlled when a downlink data is transmitted to the user equipment by the base station.

17. The central coordinator of claim 16, wherein the scheduler changes the channel state information based on whether the response signal includes one of an acknowledgement (ACK) signal and a negative acknowledgement (NACK) signal, and determines the changed channel state information as the scheduling metric.

18. The central coordinator of claim 17, wherein the scheduler determines an offset value for changing the channel state information based on whether the response signal includes one of the ACK signal and the NACK signal, and changes the channel state information by using the determined offset value.

19. The central coordinator of claim 18, wherein the scheduler determines the offset value, determined based on whether the response signal includes one of the ACK signal and the NACK signal among offset values received from the base station, as the offset value for changing the channel state information.

20. The central coordinator of claim 18, wherein, when the response signal includes the ACK signal, the scheduler determines one of a first offset value stored to change the channel state information when the response signal is the ACK signal and a second offset stored to change the channel state information when the response signal includes the NACK signal as the offset value for changing the channel state information.

* * * * *